United States Patent [19]

Schultz

[11] Patent Number: 5,613,127
[45] Date of Patent: Mar. 18, 1997

[54] SEPARATELY CLOCKED PROCESSOR SYNCHRONIZATION IMPROVEMENT

[75] Inventor: Wayne L. Schultz, Robbinsdale, Minn.

[73] Assignee: Honeywell Inc., Minneapolis, Minn.

[21] Appl. No.: 457,787

[22] Filed: Jun. 2, 1995

Related U.S. Application Data

[63] Continuation of Ser. No. 931,180, Aug. 17, 1992, abandoned.

[51] Int. Cl.⁶ .................................................. G06F 11/18
[52] U.S. Cl. ...................... 395/557; 395/182.1; 364/269; 364/271.2; 364/DIG. 1; 395/733
[58] Field of Search ...................... 395/725, 575, 395/550, 650, 182.1, 182.09, 733; 371/5.4; 364/262.9, 263.3, 269, 269.1, 271.2, 281.5, DIG. 1

[56] References Cited

U.S. PATENT DOCUMENTS

| 3,810,119 | 5/1974 | Zieve et al. | 395/650 |
| 4,330,826 | 5/1982 | Whiteside et al. | 395/550 |
| 4,733,353 | 3/1988 | Jaswa | 395/650 |
| 4,937,741 | 6/1990 | Harper et al. | 395/550 |
| 5,226,152 | 7/1993 | Klug et al. | 395/182.1 |
| 5,233,615 | 9/1994 | Goetz | 371/36 |
| 5,353,436 | 10/1994 | Horst | 395/550 |
| 5,384,906 | 1/1995 | Horst | 395/550 |

FOREIGN PATENT DOCUMENTS

| 0104490 | 9/1983 | European Pat. Off. | G06F 11/16 |
| 0372580 | 12/1989 | European Pat. Off. | G06F 11/16 |
| 8502698 | 12/1984 | WIPO | G06F 15/16 |
| 9222030 | 6/1992 | WIPO | G06F 11/16 |

OTHER PUBLICATIONS

The Fifteenth Annual International Symposium on Fault-tolerant Computing, Jun. 19–21, 1985, pp. 246–251, IEEE, NY, U.S.; T. Yoneda et al, "Implementation of Interrupt Handler for Loosely–Synchronized TMR Systems" (see p. 246, right col., line 26—p. 248, right col., line 39, Figs. 1–5).

*Primary Examiner*—Glenn A. Auve
*Attorney, Agent, or Firm*—Charles J. Ungemach

[57] ABSTRACT

Processor apparatus for control functions performed in a redundant manner utilizing separate clocks but correcting for mismatch in timing thereof by causing an interrupt of the processing through software to a "hold" status to allow time for any lagging processors to catch up before starting a next frame of processing.

4 Claims, 2 Drawing Sheets

SOFTWARE PARTITIONING

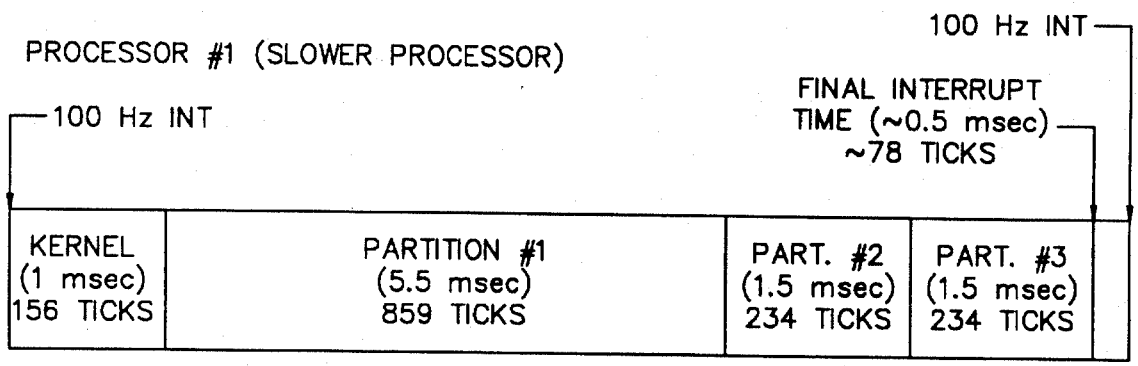
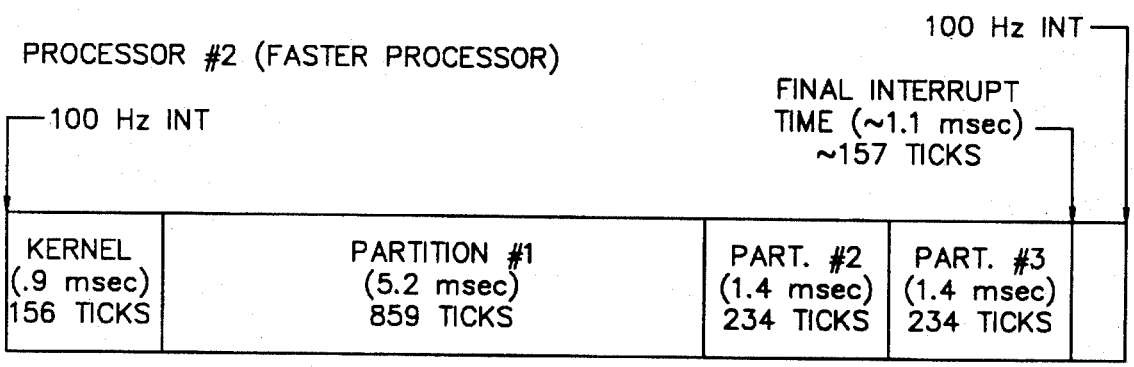
1 FRAME = 10msec

SEPARATELY CLOCKED PROCESSOR SYNCHRONIZATION IMPROVEMENT

This application is a continuation, of application Ser. No. 07/931,180, filed Aug. 17, 1992, now abandoned.

BACKGROUND OF THE INVENTION

1. Field of the Invention

The present invention relates to processors which utilize a clock source to maintain operation and more particularly to a plurality of processors which need to be locked into a synchronous operation with each other by a clock. The present invention is an improvement over copending application of J. R. Goetz entitled "Interrupt Driven, Separately Clocked, Fault Tolerant Processor Sychronization," Ser. No. 07/711,638, filed Jun. 6, 1991, no U.S. Pat. No. 5,233,615 and assigned to the assignee of the present invention.

2. Description of the Prior Art

Some systems require that certain control functions be performed in a redundant manner to prevent faulty operation in the event of a failure in one or more of the redundant control systems. In aircraft operation it is critical that the control thereof never be lost by faulty operation of the control system, and accordingly, two, three and even four parallel control systems, each using separate sensors, information processors and control devices may be employed. The multiple processors receive the same input data and are supposed to produce the same output signals unless something has gone wrong in one of the systems. To determine inconsistencies the outputs are sent to a voter where they are compared, and thus assure that the output data is consistent. This process is often impeded by the clocks in each processor not being exactly synchronized with each other. Although voters are capable of handling minor time differences from each processor, when data is processed at slightly different times in each processor, over a period of time, the difference accumulates so that the output data from one processor will differ more and more with data from another processor until the voter cannot handle the difference and meaningful comparisons become impossible.

Some prior art systems utilize a single clock for all of the processors and while this may prevent the problem with synchronism, it produced the problem of the failure of the single clock. Without redundant clocks, the tolerance for failure rate, although small, is still too large for the desired safety requirements.

In the above referred to copending application, a counter is employed in each processor to count the clock cycles from the clock and to process the data in each processor according to a predetermined number of clock cycles counted. The predetermined number is chosen so as to be sufficient for the processor to be able to perform the processing of a certain number of tasks. After the predetermined number is counted, the counter sends a signal to a set/reset flip flop which then commands the processor to stop processing data for a short period of time. Subsequently, an interrupt signal from an external source resets the flip flop, and through an interrupt controller in each processor, commands all of the processors to begin processing data again. During this time frame the output from each processor will not be different by an amount more than the voter can handle and, accordingly, the voter receives the exact same data from each processor during each such time frame.

One problem with the above referred-to copending application is the fact that the processors require a flip flop to shut them down after each time frame. This is unnecessary hardware which adds to the cost and weight of the system.

SUMMARY OF THE INVENTION

The present invention allows the use of a separate clock for each processor while assuring that the clocks produce outputs which are close enough in synchronism to provide meaningful comparisons of their outputs without requiring the use of additional hardware for this function. This is accomplished in the present invention by having the output of the counter go to an already existing interrupt controller in the microprocessor to cause an "interrupt" of the processing which, through software, causes the computer to revert to a "hold" status where it continues to operate until the next external interrupt sends it back to the data processing status where it left off. As before, the processors utilizing small slices of time at the end of a predetermined number of counts, referred to herein as a "frame" during which no output data is produced by the processors. This allows time for any lagging processors to catch up with the others before starting on the next frame. Each processor receives and processes exactly the same data in exactly the same frame. Each clock produces a fixed number of cycles for accomplishing each task, and although the frequency of the clocks may differ from one another by as much as 200 parts per million (which could result in an error of 2 microseconds at the end of 10 millisecond frame), the voter can handle this. Thereafter, a small time slice at the end of each frame allows "catching up" and all processors start the next frame at exactly the same time. As a result, the processors are never outside of a tolerable amount of clock mistiming.

BRIEF DESCRIPTION OF THE DRAWINGS

FIG. 3 shows a comparison between the handling of the same frame by a slower and a faster processor.

DETAILED DESCRIPTION OF THE PREFERRED EMBODIMENTS

Figure 1:
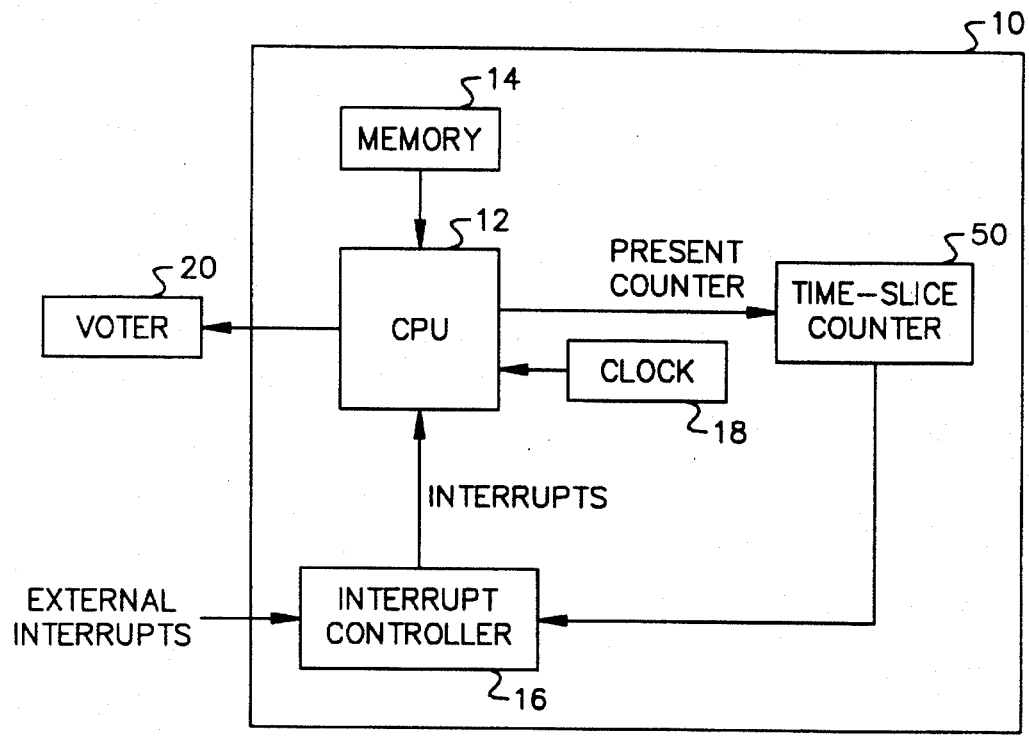
FIG. 1 shows a block diagram of a typical microprocessor.
Figure 2:
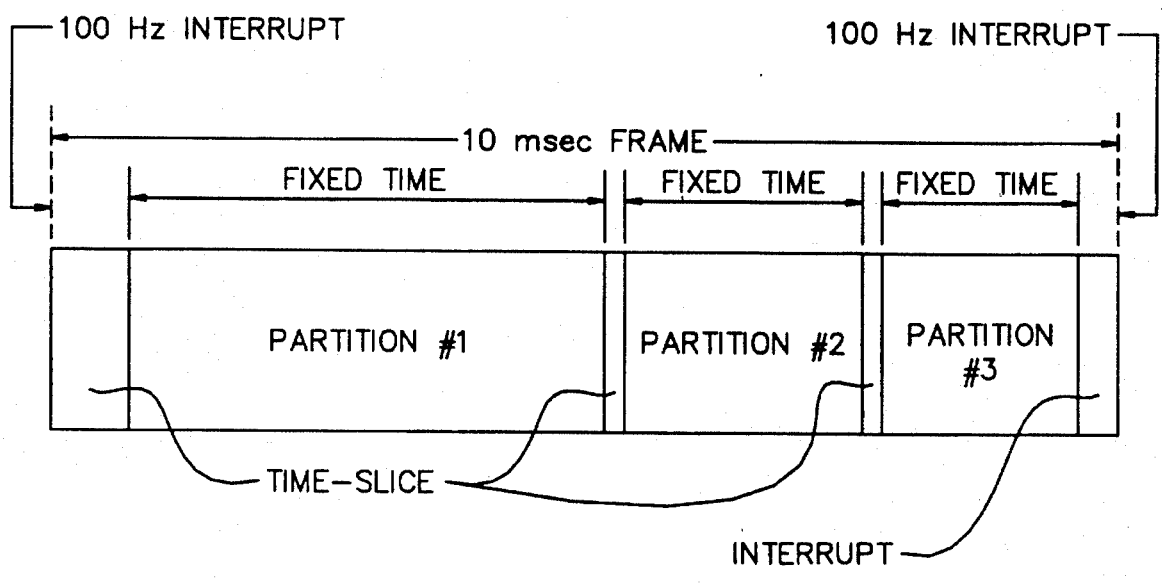
FIG. 2 shows a 10 millisecond frame containing three groups of tasks.

In FIG. 1, a microprocessor is shown as a block 10 containing a central processing unit 12 receiving a first input from a memory 14, a second input from an interrupt controller 16, a third input from an internal clock 18 and producing an output to a voter 20. Microprocessor 10 may be one of a number N of microprocessors in a redundant control system. The memory 12 provides the tasks for the CPU to perform, which may be arranged into several different groups called "partitions." One frame of partitions can be seen in FIG. 2. In FIG. 2, a 10 millisecond time frame is shown containing three partitions, each of which has a small time slice just before it during which the program sets up the processors to handle the processing in the forthcoming partition. Note that each partition is assigned a fixed time (in terms of its own internal clock) sufficient to handle the tasks of that partition and, that subsequent to the last partition, there is a time period identified as the interrupt. Each processor receives the same partitions from its memory and the same internal time to handle them. Assume, however, that clock 18 produces 200,000 cycles per second and that the clock of another processor produced 210,000 cycles per second. Furthermore, defining a "tick" as $1/128$ of a cycle, in the 200,000 cycle clock there are 1562.5 ticks per cycle while in the 210,000 cycle clock there are 1640.6 ticks per cycle. In the present invention, the same number of ticks is assigned to each partition processed by the CPU of each processor with results which can be seen in connection with FIG. 3.

In FIG. 3, the same frame containing the same three partitions is shown for the slower processor with a 20.0 MHz clock and the faster processor with a 21.0 MHz clock. The frame in each processor starts off after the 100 Hz interrupt with a Kernel (the operating system) which in both processors takes 156 ticks but in processor #1 this takes 1 millisecond, but in processor #2 it takes 0.9 milliseconds. Partition #1 uses 859 ticks in both processors, but this takes 5.5 milliseconds in Processor #1, but 5.2 milliseconds in Processor #2. Partitions #2 and #3 use 234 ticks in each processor, but this takes 1.5 milliseconds in Processor #1 and 1.4 milliseconds in Processor #2. At the end of the three partitions there is a final interrupt time which is different for the two processors. In Processor #1 this is about 78 ticks for about 0.5 milliseconds, while in Processor #2 it is 234 ticks for 1.4 milliseconds. It should be noted that the loading of each partition is an example only, that the clock skew has been greatly exaggerated (actual clock speeds vary by only about 200 parts per million) and that the final interrupt time is larger than necessary. Furthermore, only two of the N processors are shown in FIG. 3.

Returning to FIG. 1, an output from CPU 12 is shown connected to a "Time Slice Counter" 50 which operates to count the clock cycles and to provide an output after the correct number of ticks have occurred for the frame. This output is presented to the interrupt controller 16 which then interrupts the operation of the CPU for the required time. An External Interrupt signal is also presented to the interrupt controller to provide the starting interrupts for the CPU.

Accordingly, although the processor may produce an output which is in slight time variance from the other processors, the time difference is in the acceptable region and the data never differs because it is not allowed to accumulate to produce uncheckable results.

Many changes will occur to those skilled in the art and I do not wish to be limited to the specific disclosures used in connection with the description of the preferred embodiment. I wish only to be limited by the following claims.

I claim:

1. A computing system comprising, in combination:

a plurality of microprocessors each having a central processing unit, an interrupt controller and an output, each central processor having a program programmed to synchronously execute an identical set of tasks to produce each output;

a plurality of clocks one each connected to each microprocessor for producing a plurality of timing pulses, said clocks having frequencies which may differ by 200 parts per million, each program having allotted thereto a predetermined number of pulses so that the same number of tasks are executed in each program by each processor although often taking slightly different times due to the frequencies which may differ;

counter means connected to each microprocessor and operable to count pulses from the clock connected to the microprocessor with which the counter means is connected and to produce an output signal after the predetermined number of pulses; and means connecting the counter means connected to each microprocessor to the interrupt controller of the microprocessor with which the counter means is connected to provide the output signal thereto, upon receipt of the output signal the interrupt controller interrupting the central processing unit of the microprocessor with which the counter means is connected to assure that the output of each microprocessor includes the same number of performed tasks; and means for supplying periodic external interrupt signals at equal intervals to the interrupt controller to restart the processing of the central processing unit.

2. Apparatus according to claim 1 further including a voter connected to receive the output of each of the microprocessors.

3. Apparatus according to claim 2 further including a memory connected to each central processing unit and operable to supply the set of tasks thereto.

4. Apparatus for periodically synchronizing a plurality of microprocessors each having a central processing unit, an internal interrupt controller, an input to receive an external periodic interrupt signal, an output, each microprocessor being programmed to synchronously execute an identical set of tasks to produce each output and each microprocessor having a separate clock with a different frequency so that one of the plurality of microprocessors is the slowest to execute its tasks, comprising:

counter means connected to each microprocessor to count pulses from each microprocessor's clock and to produce a plurality of pause signals, one after a predetermined number of pulses from each clock, the predetermined number being sufficient to permit the slowest microprocessor to execute its tasks;

means connecting the counter means to the interrupt controller of each microprocessor to provide the pause signal thereto so that upon receipt of the pause signal, each microprocessor which is faster than the slowest microprocessor stops processing until the slowest microprocessor finishes its tasks; and periodic signal producing means connected to each microprocessor to simultaneously provide signals at equal intervals which synchronously start all microprocessors after the slowest microprocessor has finished its tasks.

* * * * *